(12) United States Patent
Roach

(10) Patent No.: US 6,756,116 B2
(45) Date of Patent: Jun. 29, 2004

(54) SURFACE TREATMENT OF ETHYLENE-BASED POLYMER PELLETS TO IMPROVE BLOCKING RESISTANCE

(75) Inventor: Brian Thomas Roach, Westlake, LA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 120 days.

(21) Appl. No.: 10/076,159

(22) Filed: Feb. 14, 2002

(65) Prior Publication Data

US 2003/0157328 A1 Aug. 21, 2003

(51) Int. Cl.[7] ................................................ B32B 5/16
(52) U.S. Cl. ...................... 428/402; 428/403; 524/394; 524/399; 524/400
(58) Field of Search ................................ 428/402, 403, 428/407; 524/394, 399, 400

(56) References Cited

U.S. PATENT DOCUMENTS

| | | |
|---|---|---|
| 3,528,841 A | 9/1970 | Donaldson et al. |
| 3,753,965 A | 8/1973 | Looney et al. |
| 3,969,304 A | 7/1976 | Pugh et al. |
| 4,463,124 A * | 7/1984 | Flores et al. ............... 524/394 |
| 4,510,281 A | 4/1985 | Smith |
| 4,769,289 A | 9/1988 | Kelly et al. |
| 4,897,437 A | 1/1990 | McKinney et al. |
| 5,286,771 A | 2/1994 | Smith |
| 6,500,888 B2 * | 12/2002 | Baumgartner et al. ...... 524/394 |

FOREIGN PATENT DOCUMENTS

| | | |
|---|---|---|
| GB | 1378222 | 12/1974 |
| JP | 60-23449 | 2/1985 |
| WO | WO 02/051916 A2 | 7/2002 |

OTHER PUBLICATIONS

Donald L. Brebner, "Troubleshooting heat seal layers of "SURLYN" ionomer resin", Heat Seal Layers of "SURLYN".

Robert T. Van Ness, "Heat seal performance", Heat Seal Layers of "SURLYN".

PCT International Search Report for International application No. PCT/US 03/04148 dated May 19, 2003.

* cited by examiner

Primary Examiner—Leszek B Kiliman

(57) ABSTRACT

The method of this invention for raising the stick temperature of pellets of ethylene-based copolymers with an acid content at least 5 weight percent has the steps of contacting the pellets with an aqueous solution of a water-soluble metal salt of an aliphatic acid having fewer than 12 carbon atoms, and drying the pellets. The resulting ethylene-based copolymers have a stick temperature of above 25° C. and preferably at least 5° C. above that of the untreated pellets.

14 Claims, No Drawings

SURFACE TREATMENT OF ETHYLENE-BASED POLYMER PELLETS TO IMPROVE BLOCKING RESISTANCE

BACKGROUND OF THE INVENTION

1. Field of Invention

This invention is directed to a process for increasing the stick temperature of ethylene-based polymer pellets and to the resulting pellets that have resistance to blocking under storage conditions and under conventional operating temperatures used to process the polymer pellets.

2. Related Art

Polymer pellets after their manufacture as well as during shipment and subsequent handling, such as when the pellets are charged into an extruder for further processing to form articles, need to remain free flowing and not stick together or agglomerate at conventional storage, shipping and operating temperatures. Additives that reduce blocking or sticking can be melt blended into the polymer before it is pelletized or an additive can be applied to the surface of the pellet. In either case, the additive should remain effective from the time the pellet is formed to when the customer uses the pellet. The additive must not cause operability problems in equipment during handling either while the pellet is being formed, conveyed, packaged or in the customer's plant. The additive must not negatively affect the end use properties of the product and must meet regulations pertaining to food contact in the event the product is used, for example, for food packaging.

Donaldson et al., U.S. Pat. No. 3,528,841, issued Sep. 15, 1970, teaches the use of a copolymer of ethylene oxide and propylene oxide on polymeric pellets to reduce tackiness. Pugh et al., U.S. Pat. No. 3,969,304, issued Jul. 13, 1976, shows the use of slip agents for polyethylene films of various inorganic powders and organic materials such as erucamides, oleamides, sulfonates, stearates, stearamides, and the like. Kelly et al., U.S. Pat. No. 4,769,289, issued Sep. 6, 1988, teaches the use of fumed silica on polar ethylene interpolymers to form free flowing polymer particles. Smith, U.S. Pat. No. 5,286,771, issued Feb. 15, 1994, shows various alcohols, ethers, alkylene oxide polymers, and oils as additives to reduce blocking of polymer pellets. Japanese Patent Kokai No. Sho 60(1985)-23449, published Feb. 2, 1985, teaches the use of an alkali metal salt of a higher aliphatic acid having 8–22 carbon atoms or an ester of such an acid to reduce the adhesion problems of thermoplastic resin particles or pellets. However, none of these patents are concerned with reducing the blocking of pellets of ethylene-based copolymers having a relatively high acid content, for example, polymers having an acid content of 5–30% by weight.

While co-pending application U.S. Ser. No. 09/749,093, which is incorporated herein by reference, does address the problem of blocking of ethylene-based copolymers having relatively high acid content, it presents other problems, particularly handling difficulties. The invention in this co-pending application requires application of a metal salt of a $C_{12-22}$ aliphatic acid to the ethylene-based polymers. These metal salts are solids that must be applied either as a dry powder or from aqueous dispersions, which typically also contain surfactants to disperse the solid metal salts in the aqueous medium. Because these metal salts are solids, they present problems normally associated with solids handling, such as settling in pipe lines and vessels used for making or storing slurries, erosion, dust creation, and added energy and maintenance costs associated with need for agitation to keep solids suspended.

The process of the present invention solves these handling problems while still raising stick temperature of pellets sufficiently to avoid blocking problems.

SUMMARY OF THE INVENTION

This invention is directed to a means for increasing the stick temperature (particularly to at least 25° C., particularly at least 5° C. above the stick temperature of the untreated pellet) of ethylene-based acid copolymer pellets having an acid content at least 5% by weight, particularly copolymers having acid content of about 5 to about 30% by weight. A solution of one or more water-soluble metal salts of aliphatic acids having fewer than twelve carbons, preferably soluble metal salts of $C_{4-10}$ aliphatic acids, is applied to the pellets, and the pellets are dried. The metal salts are preferably in an aqueous solution in an amount sufficient to increase the stick temperature to above 25° C., preferably by 5° C. or more above that of the pellets before treatment.

The dried pellets have an effective amount of a surface coating of the metal salt of the $C_{4-10}$ aliphatic acid to increase the stick temperature of the copolymer to a temperature above 25° C. Preferably, the amount of coating is sufficient to raise the stick temperature at least 5° C. above that of the untreated pellet. Preferred ethylene-based copolymer pellets comprise repeating polymerized units of (a) at least 50% by weight, based on the weight of the copolymer, of ethylene, (b) 5 to 30% by weight, based on the weight of the copolymer, of acrylic acid or methacrylic acid; and (c) 0 to 40% by weight, based on the weight of the copolymer, of an alkyl acrylate or an alkyl methacrylate, wherein the copolymer has 0–100% of the acid groups neutralized with metal cations, particularly those selected from the following group: zinc, magnesium, sodium and lithium, and the surface coating comprises an effective amount of one or more metal salts (preferably a sodium salt) of one or more aliphatic acids having fewer than 12 carbon atoms, preferably water-soluble metal salts of aliphatic acids having 4 to 10 carbon atoms, generally in an amount of 25 to 6,000 ppm (parts by weight metal salt of aliphatic acid per million parts by weight of copolymer).

DETAILED DESCRIPTION OF THE INVENTION

The ethylene-based, relatively-high-acid-containing, copolymer pellets of this invention are free flowing and can be transported and processed using conventional equipment without blocking or sticking of the copolymer pellets. They are made by contacting the pellets with an aqueous solution of one or more metal salts of an aliphatic acid having fewer than twelve carbon atoms, particularly an aqueous solution of one or more water-soluble metal salts of a $C_{4-10}$ aliphatic acid. Metal salts of $C_{4-11}$ aliphatic acids that are not water soluble can be applied from an aqueous dispersion or as a dry solid as provided in co-pending application Ser. No. 09/749,093, but don't have the processing advantages associated with using aqueous solutions. Upon drying, sufficient metal salt of the aliphatic acid having fewer than 12 carbon atoms, preferably of the $C_{4-10}$ aliphatic acid, remains deposited on the polymer pellets to raise the stick temperature of the pellets to a temperature of above 25° C., preferably to a temperature that is at least 5° C. higher than the stick temperature of the untreated pellets. Even small increases in the stick temperature above 25° C. can be highly desirable for many of the operations involved in the production, handling, shipping and storage of polymer pellets. Preferably, the stick temperature is increased to 30–60° C. One particular advantage of the above coating of the metal salt is that it is a tenacious coating and a sufficient amount of the coating is retained during subsequent processing, shipping and storage of the pellets to maintain an effective stick temperature that prevents blocking or agglomeration of the pellets.

Terms such as "deposited on", "coated", "coating", and the like are not limited to conditions where the metal salt is only on the surface of the pellet or where the metal salt completely covers the surface. The terms do not exclude conditions where the metal salt may be partially absorbed in the pellet and where the metal salt covers less than all the surface of the pellet.

The word "copolymer" as used herein embraces a polymer formed with two or more monomers.

The term "stick temperature" is defined as the maximum temperature at which all polymer pellets held in a test apparatus and subjected to fixed conditions as discussed below empty from the apparatus in less than one minute following the hold up under fixed conditions. To measure the stick temperature, polymer pellets are placed in a vertical tube having an inside diameter of 3.9 centimeter (cm) and a length of 23.2 cm lined loosely with a 5 mil (127 micron) thick film of Mylar® polyethylene terephthalate. A 4086 gram weight is placed on top of the pellets so that the downward pressure is 33.5 kPa. Hot air is passed upward through the pellets at 30 liters per minute (L/min) for 15 minutes followed by ambient temperature air at 130 L/min for 5 minutes. The weight is then removed and the tube is inverted. Time during which all of the pellets flow out of the tube is noted. The test is repeated at gradually increasing temperatures until a point is reached when only a portion of the copolymer pellets or none of the pellets flow out of the tube. The stick temperature is the last temperature at which all of the pellets flow out in less than one minute.

The term "alkyl (meth)acrylate" as used herein refers to alkyl esters of acrylic acid and methacrylic acid.

Typical ethylene-based copolymers of this invention are ethylene/acid copolymers and ethylene/acid/alkyl (meth) acrylate copolymers containing 5–30% by weight of polymerized $C_{3-8}$ α,β-ethylenically unsaturated carboxylic acid monomers, particularly acrylic acid or methacrylic acid. Copolymers having an acid content of 5% or greater often have a stick temperature below 25° C. Generally, polymers having an acid content above 30% are not made.

Ethylene-based copolymers of this invention contain at least 50% of polymerized ethylene, 5 to 30% by weight of a polymerized acid constituent such as acrylic or methacrylic acid and 0 to 40% by weight of a polymerized alkyl (meth)acrylate. This invention is particularly applicable to but not limited to ethylene/acid copolymers containing 75–85% by weight ethylene and 15–25% by weight of acrylic acid or methacrylic acid, such as an ethylene (81%)/ methacrylic acid (19%) copolymer, an ethylene(85%)/ methacrylic acid(15%) copolymer and an ethylene(80%)/ acrylic acid(20%) copolymer.

Other useful copolymers contain at least 50% and preferably, 65 to 85% by weight polymerized ethylene, 15 to 25% by weight acrylic or methacrylic acid and 5–30% by weight of an alkyl (meth)acrylate. Typical of such copolymers are ethylene/methacrylic acid/n-butyl acrylate having a weight ratio of components of 67.5/9/23.5.

The copolymers also include ionomers in which up to about 100%, preferably 5 to 70% of the acid groups are neutralized with one or more cations known in the art for making ionomers. Preferably, cations are selected from the group consisting of lithium*, sodium*, potassium, magnesium*, calcium, barium, lead, tin, or zinc* (*=preferred), or a combination of such cations.

These ethylene-based copolymers typically have a melt index (MI) of 0.5 to 2000, preferably 1 to 1000, grams/10 minutes determined by ASTM D 1238 using condition E (2190 g, 190° C.)

The copolymer pellets of this invention are of the normal size. A broad range is from 0.4 to 18 g/100 pellets, typically 1 to 5 g/100 pellets and usually 2 to 4 g/100 pellets. Pellet size does not directly affect this invention. Smaller pellets can be cooled more rapidly than larger pellets but tend to block more readily. This is an inherent feature of pellets and not directly related to this invention.

These copolymer pellets are coated with an effective amount of one or more metal salts, preferably water-soluble metal salts, of an aliphatic acid having fewer than 12 carbon atoms, preferably sodium salts and more preferably sodium salts of $C_{4-10}$ aliphatic acids, to prevent blocking of the pellets during handling, shipping and processing. Generally, 25 to 6,000 ppm (parts by weight per million parts by weight of copolymer) of the metal salt, preferably the water-soluble metal salt, are used and preferably, 50 to 2,500 ppm are used.

Typical metal salts of aliphatic acid are calcium, sodium, magnesium and zinc salts. Examples of preferred salts of $C_{4-10}$ aliphatic acids are calcium butyrate, zinc butyrate, sodium butyrate, magnesium butyrate, calcium caproate, zinc caproate, sodium caproate, magnesium caproate, calcium caprylate, zinc caprylate, sodium caprylate, magnesium caprylate, calcium caprate, zinc caprate, sodium caprate, and magnesium caprate.

The preferred metal salts are those which can effectively be dissolved in water by techniques known to those skilled in the art, particularly the sodium salts that can be dissolved to concentrations up to 50 weight percent sodium salt. Preferred sodium salts are sodium butyrate, sodium caproate, sodium caprylate, and sodium caprate. Sodium caprylate, which is readily available, is particularly preferred.

The copolymer pellets are contacted with an aqueous solution of the water-soluble metal salt under conditions that assure contact with all surfaces of the pellet, and then are dried. One technique is to immerse the pellets in the aqueous solution for 0.5 to 30 minutes and then remove, and then to dry the pellets, for example, by blowing air, typically ambient temperatures or higher, particularly at temperatures of 20 to 30° C. or higher, through the pellets until dry. Another technique that can be used is to spray the pellets with the aqueous solution, preferably agitating the pellets, and then drying the pellets as above. These methods can be carried out in a batch or a continuous process.

Those metal salts of the aliphatic acids having fewer than 12 carbon atoms, particularly $C_{4-10}$ aliphatic acids, that do not dissolve in an aqueous media may be applied from an aqueous dispersion followed by drying or as a dry solid or powder.

The use of the aforementioned metal salts improves blocking resistance and increases the stick temperature of the copolymer pellets while not adversely affecting other properties, such as heat sealing characteristics of the ethylene-based copolymer. Also, coating with the aforementioned metal salts does not increase the haze of the copolymer significantly, and does not cause the copolymer to yellow on exposure. The moisture content of the copolymer pellets does not increase with the use of the metal salt.

EXAMPLES

The following examples illustrate the invention. All parts, ratios and percentages are on a weight basis unless otherwise indicated. MI (melt index) and ST (stick temperature) of the copolymers were determined as described above.

Example 1

This example compares conventional blocking agents to a metal salt of a $C_{4-10}$ aliphatic carboxylic acid, sodium caprylate, and the effect on stick temperature of the copolymer pellets. In each case, unroughened pellets of the following copolymer were used: E/MAA copolymer (ethylene/methacrylic acid, weight ratio 81/19), melt index of 60 (g/10 min), having a stick temperature of 27° C. In each of the following cases, the additive was applied in essentially the same manner. In the case of sodium caprylate, the copolymer pellets were immersed in an aqueous solution and then the pellets were dried with ambient air and the stick temperature was determined. In the case of the other additives, the copolymer pellets were immersed in an aqueous dispersion of the particular additive and then the pellets were dried with ambient air and the stick temperature was determined. In each case, 5000 ppm (parts per million) based on the copolymer, of the additive were deposited on the copolymer pellets. The results of this comparison are shown in Table 1.

TABLE 1

| Additive | Stick Temperature (° C.) | Increase in Stick Temp. (° C.) |
|---|---|---|
| Sodium Caprylate 40 | >60 | >33 |
| Synpro ® CaSt 15 (Calcium Stearate) | >61.9 | >34.9 |
| Synpro ® CaSt 15 | >60 | >33 |
| Kemamide ® W-20 (Ethylene bis oleamide) | 40.5–43.0 | 13.5–16.5 |
| Paraflint ® H1N5 (Fischer-Tropsch Wax— a paraffin type wax) | 38.7–39.3 | 11.7–12.3 |
| Paraflint ® H1N5 | 39 | 12 |
| Microthene ® FN 500 (Fine low density polyethylene) | 43.1–43.5 | 16.1–16.5 |
| Microthene ® FN 500 | 41–42 | 14–15 |

The results in Table 1 show that sodium caprylate provides an improvement in the stick temperature of the copolymer pellets in the range of 2–3 times that which is provided by the conventional additives of ethylene bis-oleamide, Fischer-Tropsch Wax and fine low density polyethylene. Additionally, the results in Table 1 show that sodium caprylate is equivalent in effectiveness to that of calcium stearate, while eliminating the process operability issues associated with applying a dispersion.

Example 2

This example is to show different levels of sodium caprylate deposited onto pellets of the copolymer described in Example 1 and the resulting change in stick temperature of the copolymer. Also, this example compares the stick temperature of coated pellets before and after roughening of the pellets. The sodium caprylate was applied using the same procedure as used in Example 1 to coat sodium caprylate onto the pellets. Sodium caprylate was applied to unroughened pellets and the stick temperature was measured. Then, the pellets were tumbled in a container to roughen them and the stick temperature of the roughened pellets was measured. The results of this example are shown in Table 2.

TABLE 2

| Sodium Caprylate Additive Level (ppm) | Unroughened Pellets Stick Temperature (° C.) | Roughened Pellets Stick Temperature (° C.) |
|---|---|---|
| 0 | 27.0 | — |
| 100 | 46 | 44.5 |
| 600 | 55 | 55 |
| 1000 | 57.5 | 57 |
| 2000 | >60 | >60 |

The data in Table 2 shows that there was a significant increase in Stick Temperature of the unroughened copolymer pellet after the application of 100–2000 ppm of sodium caprylate. These pellets after the roughening procedure retained the improved stick temperature showing that conventional usage such as packaging, shipping and subsequent handling which would cause roughening of the pellets did not remove the sodium caprylate coating from the pellets.

The uncoated pellets and each of the coated pellets were each molded into plaques and measured for haze. There was an increase in haze from about 1–3% along with the rise in the level of sodium caprylate additive but when the pellets were melt mixed in an extruder and then formed into plaques, no difference in haze was noted between the sodium caprylate treated copolymers and untreated copolymers.

Example 3

This example shows the effectiveness of several water-soluble salts of aliphatic acids having 4 to 10 carbon atoms. The salts were deposited onto pellets of the copolymer described in Example 1. The salts were applied using the same procedure as used in Example 1 to coat the pellets with sodium caprylate. In each case, 300 ppm, based on copolymer weight, of the additive were deposited on the copolymer pellets. The results of each additive are shown in Table 3.

TABLE 3

| Metal Salt Additive | Stick Temperature (° C.) | Stick Temp. Difference (° C.) |
|---|---|---|
| No Additive | 27 | — |
| Sodium Butyrate | 40 | 13 |
| Sodium Caprate | 54 | 27 |
| Sodium Caprylate | 55 | 28 |
| Sodium Caproate | 46 | 19 |

The results in Table 3 show the efficacy of aqueous solutions of sodium salts of aliphatic acids with 4 to 10 carbon atoms. In each case, stick temperature is improved to 40° C. or better.

What is claimed is:

1. A process for forming free-flowing pellets of ethylene-based, copolymers comprising repeating polymerized units of
   (i) at least 50% by weight, based on the weight of the copolymer, of ethylene,
   (ii) 5 to 30% by weight, based on the weight of the copolymer, of an ethylenically unsaturated acid selected from the group consisting of acrylic acid and methacrylic acid; and (iii) 0 to 40% by weight, based on the weight of the copolymer, of an alkyl (meth)acrylate,
wherein the copolymer has 0–100% of the acid groups neutralized with one or more metal cations,
the process comprising the steps of
(i) contacting the pellets with an aqueous solution consisting essentially of a sufficient amount of one or more water-soluble metal salts of aliphatic acid having 4 to 10 carbon atoms to increase the stick temperature to a temperature at least 5° C. higher than the stick temperature of the pellets before being contacted; and,
(ii) drying the pellets.

2. The process of claim 1 wherein the stick temperature of the contacted pellet is raised to at least 25° C.

3. The process of claim 1 or 2 wherein the one or more metal salts of aliphatic acid are selected from the group consisting of sodium salts of the $C_{4-10}$ aliphatic acids.

4. The process of claim 3 wherein the aqueous solution is sprayed onto the copolymer pellets and the resulting coated pellets are dried with blown air at ambient temperature or higher.

5. The process of claim 3 wherein the pellets are immersed in the aqueous solution, the pellets are removed from the aqueous solution, and the pellets are dried with blown air at ambient temperature or higher.

6. The process of claim 3 wherein the sodium salt is selected from the group consisting of sodium butyrate, sodium caproate, sodium caprylate, and sodium caprate, and the coating of the sodium salt is applied in an amount of 25–6,000 parts by weight per million parts copolymer.

7. The process of claim 6 wherein the sodium salt is sodium caprylate and the sodium caprylate is applied in an amount of 50–2,500 parts by weight per million parts copolymer to increase the copolymer stick temperature to 30 to 60° C. and wherein the ethylene copolymer has a melt index of 0.5 to 2000 g/10 minutes determined according to ASTM D 1238 condition E.

8. Pellets of high-stick-temperature, ethylene-based copolymer comprising
a. ethylene-based copolymer having repeating polymerized units of
(i) at least 50% by weight, based on the weight of the copolymer, of ethylene,
(ii) 5 to 30% by weight, based on the weight of the copolymer, of an ethylenically unsaturated acid selected from the group consisting of acrylic acid and methacrylic acid; and
(iii) 0 to 40% by weight, based on the weight of the copolymer, of an alkyl (meth)acrylate, wherein the copolymer has 0–100% of the acid groups neutralized with metal cations, and
b. a sufficient amount of a surface coating consisting essentially of one or more water-soluble metal salts of an aliphatic acid having 4 to 10 carbon atoms to increase the copolymer stick temperature to a temperature at least 5° C. above the temperature of the pellets without the coating.

9. The pellets of claim 8 wherein the surface coating comprises one or more metal salts of $C_{4-10}$ aliphatic acid in an amount of 25 to 6,000 parts metal salt by weight per million parts copolymer.

10. The pellets of claim 9 in which the metal portion of the metal salts is selected from the group consisting of calcium, sodium, magnesium and zinc.

11. The pellets of claim 10 wherein the high-stick-temperature, ethylene-based copolymer has a stick temperature in the range of 30 to 60° C., the copolymer has a melt index of 0.5 to 2000 g/10 minutes determined according to ASTM D 1238 Condition E, and the surface coating is selected from the group consisting of sodium butyrate, sodium caproate, sodium caprylate and sodium caprate.

12. The pellets of claim 11 comprising a copolymer of 15–25% by weight of acrylic acid or methacrylic acid and 75–85% by weight ethylene and a surface coating of sodium caprylate in an amount of 50–2,500 parts of sodium caprylate by weight per million parts copolymer.

13. The pellets of claim 11 comprising a copolymer of 15–25% by weight of acrylic acid or methacrylic acid, 5–30% alkyl(meth)acrylate and 65–85% by weight ethylene and a surface coating of sodium caprylate in an amount of 50–2,500 parts of sodium caprylate by weight per million parts copolymer.

14. The pellets of claim 12 or 13 wherein 5–70% by weight of the copolymer acid groups are neutralized with one or more metal ions selected from the group consisting of zinc, magnesium, sodium and lithium.

* * * * *